United States Patent [19]

Loomans

[11] 3,802,278

[45] Apr. 9, 1974

[54] MIXER DRIVE MECHANISM

[75] Inventor: Bernard A. Loomans, Saginaw, Mich.

[73] Assignee: Baker Perkins Inc., Saginaw, Mich.

[22] Filed: Jan. 24, 1972

[21] Appl. No.: 219,967

[52] U.S. Cl.............................. 74/22, 64/17
[51] Int. Cl............................. F16h 21/00
[58] Field of Search............. 74/22; 64/17, 18, 25

[56] References Cited
UNITED STATES PATENTS

| 3,396,553 | 8/1968 | Potter | 64/17 R |
| 2,711,653 | 6/1965 | Zero | 74/22 |
| 2,933,800 | 4/1960 | Friden | 74/22 |
| 3,180,137 | 4/1965 | Tannenberg | 74/22 |
| 3,192,868 | 7/1965 | Wahlmark | 74/22 |
| 3,380,116 | 4/1968 | Cox et al. | 74/22 |

Primary Examiner—Manuel A. Antonakas
Assistant Examiner—Wesley S. Ratliff, Jr.
Attorney, Agent, or Firm—Learman & McCulloch

[57] ABSTRACT

Mixer drive apparatus for reciprocating and rotating a mixer shaft including a support frame or housing, a drive shaft, which includes an axially inclined shaft section, connected to the mixer shaft and rotatably and slidably supported on the frame, and a universal joint-like part reacting between the frame and the inclined shaft section to axially reciprocate the drive shaft and mixer shaft as they are being rotated.

9 Claims, 5 Drawing Figures

MIXER DRIVE MECHANISM

FIELD OF THE INVENTION

This invention relates to mixers having a kneading screw which both reciprocates and rotates, and more particularly to new and novel apparatus for reciprocating and rotating such a screw.

BACKGROUND OF THE INVENTION

Mixers of the type disclosed in U.S. Pats. Nos. 3,023,455 and 3,362,044, both of which are assigned to the assignee of the present invention, include interrupted flight kneading screws or worms which are rotated, as well as reciprocated, within a tubular mixing barrel having radially projecting lugs in order to effect proper mixing of the plastic substances, and the like, being mixed. When heavy or viscous loads are being mixed, the axial force which must be exerted on the shaft to effect reciprocation is relatively large and thus, it is important that the mechanism for effecting such reciprocatory movement be sturdily constructed to withstand relatively large axial loads without distorting.

It is a primary object of the present invention to provide simple, rugged mixer drive mechanism, with a minimum number of moving parts, for reciprocating and rotating such a mixer shaft.

It is another object of the present invention to provide heavy duty mixer drive mechanism which will efficiently axially reciprocate a mixer shaft as it is being rotated to mix heavy loads of plastic material.

It is yet another object of the present invention to provide a mixer drive mechanism which can, if the process requires, carry a suitable, circulated heat transfer fluid in an axial path between said drive shaft and mixer shaft.

Other objects and advantages of the present invention will become apparent to those of ordinary skill in the art as the description thereof proceeds.

SUMMARY OF THE INVENTION

Apparatus for simultaneously rotating and axially reciprocating a kneading screw comprising a frame or housing; a rotary drive shaft, including a shaft section axially inclined to the rotational axis of the drive shaft; connected to the kneading screw and rotatably and slidably mounted on the frame; and means, including a part movable in a swinging path of travel about an axis transverse to and spaced from the rotational axis of the drive shaft, reactable between the frame and inclined shaft section, to reciprocate the drive shaft and kneading screw in an axial to-and-fro path when the drive shaft is rotated.

The present invention may more readily be described by reference to the accompanying drawings, in which.

THE DESCRIPTION OF THE PREFERRED EMBODIMENT

Figure 1:
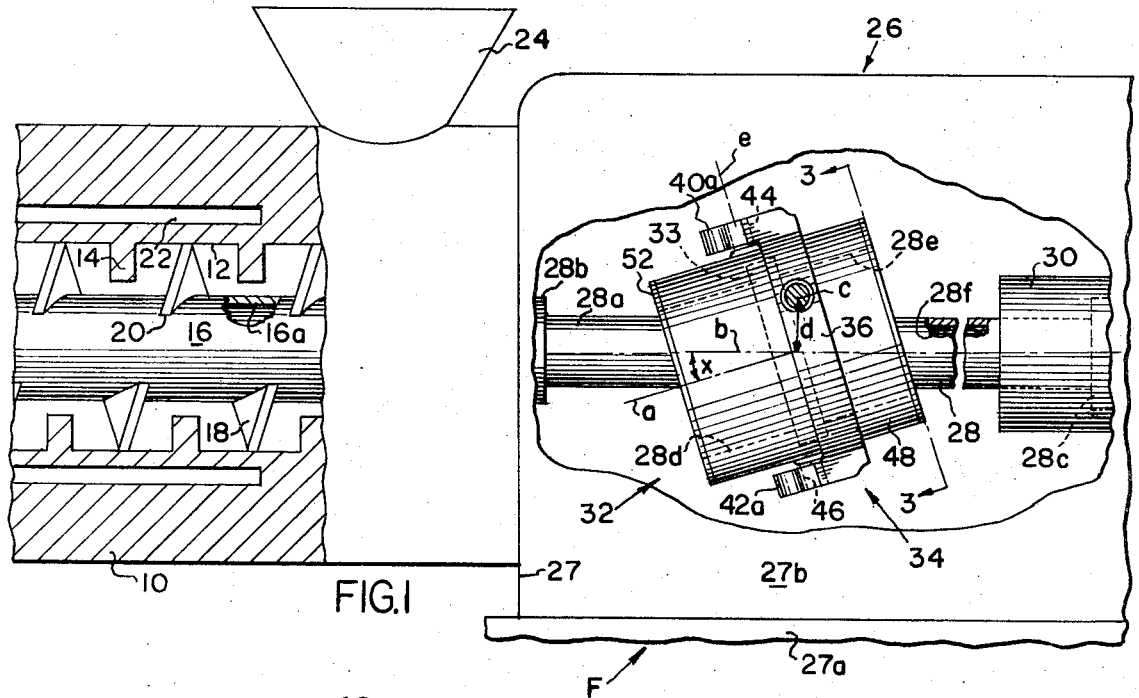
FIG. 1 is a partly sectional, side elevational view of reciprocating and rotating drive apparatus, constructed according to the present invention, drivingly connected to the kneading screw of a mixer, part of the drive apparatus housing being broken away to more clearly illustrate the drive apparatus.

Apparatus constructed according to the present invention is particularly adapted for use with a mixing machine of the type disclosed in the aforementioned U. S. Pats. Nos. 3,023,455 and 3,362,044, which are incorporated herein by reference, and to which reference may be had for a more detailed disclosure of the mixing characteristics of the present apparatus.

Briefly, however, the mixing apparatus includes a tubular mixing barrel 10, defining an axially extending mixing or blending chamber 12, and having axially spaced kneading teeth 14 extending radially inwardly into the chamber 12. Rotatably journaled in the barrel 10, and disposed in the chamber 12, is a tubular mixing shaft 16, having a plurality of worm blades or threads 18 which are interrupted at intervals, as indicated at 20, so as to permit reciprocation of the shaft 16 without interference between the teeth 14 and the blades 18. A feed hopper 24 is attached to one end of the passage 12 for delivering plastic or other material to be mixed thereto. Heat exchange compartments 22 are provided in the mixing barrel 10 and a bore 16a is provided through the shaft 16 through which suitable temperature control fluids, such as heat exchange mediums, may be circulated to control the temperature of the material fed to the chamber 12. Extruding mechanism, illustrated and described in the referenced patents, may be connected to the opposite end of the passage 12.

Figure 2:
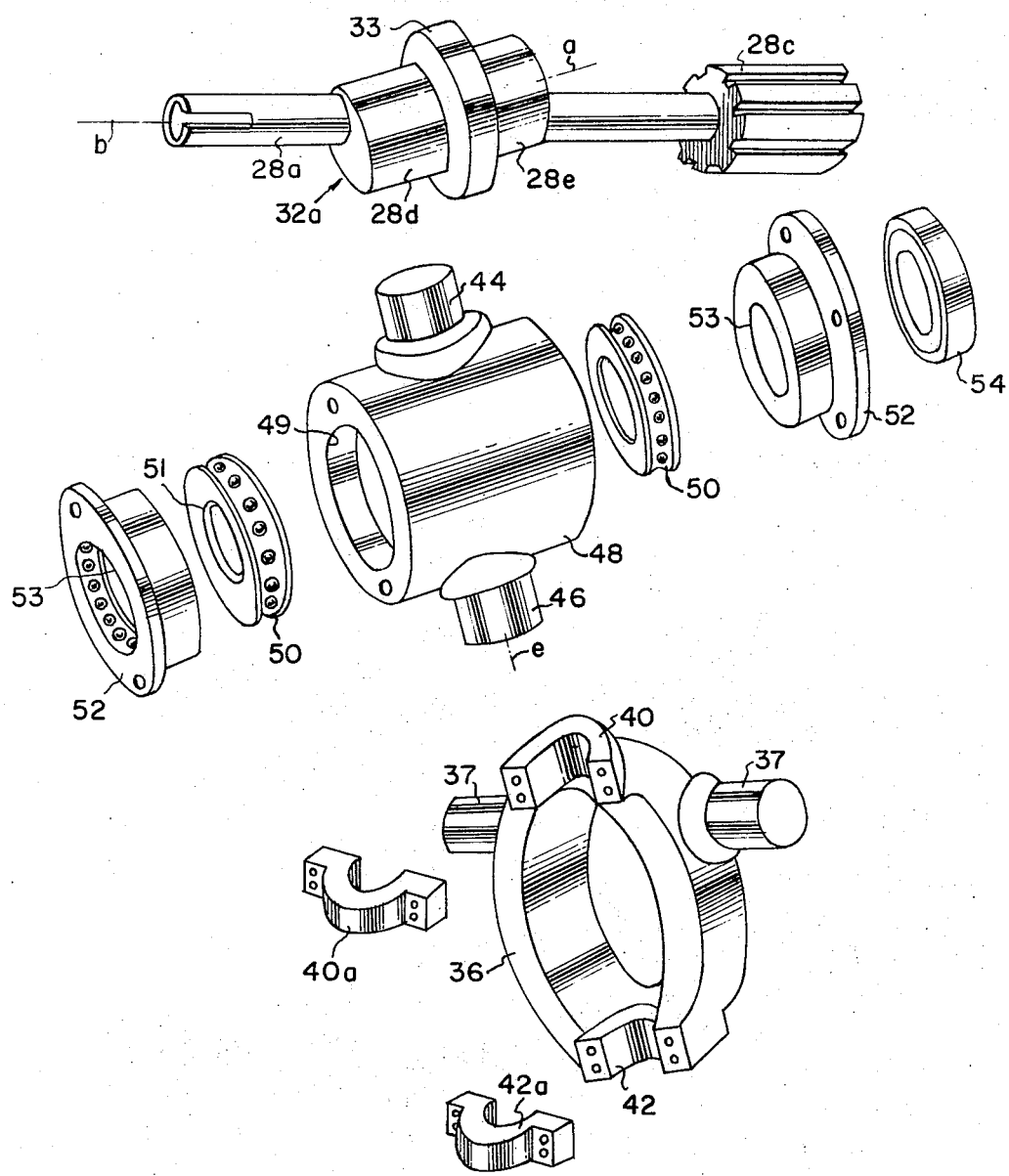
FIG. 2 is an enlarged, exploded view illustrating drive apparatus constructed according to the present invention.

Referring now more particularly to FIGS. 1 and 2, drive apparatus, generally designated 26 and constructed according to the present invention, is provided for reciprocating and rotating the mixer shaft 16 and comprises a frame or housing F having a base 27a, end walls 27 and side walls 27b. One of the end walls 27 is removably coupled to one end of the mixing barrel 10. The mixer drive apparatus 26 includes an internally splined, torque transmitting, rotary shaft 30 (FIG. 4) which is journaled in suitable bearings (not shown) provided in the other end wall 27 and driven by any suitable source of power, such as an electric motor. The shaft 30 includes a bore 30a therethrough in which heat exchange medium may be circulated. A drive shaft, generally designated 28, is provided and includes an externally splined end 28c slidingly received by the complementally splined collar or shaft 30. The other end 28a of the drive shaft 28 is fixedly coupled to the mixer shaft 16 by a suitable coupling 28b (FIG. 1).

The drive shaft 28 includes an axially inclined balanced shaft section, generally designated 32, including a symmetrical crank-like portion 32a having an axis $a$ inclined at an angle $x$, to the rotational axis $b$ of the drive shaft 28. The crankshaft portion 32a, which may be referred to as a "Z-shaft" section because of its shape, may be geometrically divided into identical half portions 28d and 28e (FIG. 1), on opposite sides of the rotational axis $b$. The half portions 28d and 28e are equally eccentric, relative to axis $b$ and 180° out of phase, so that harmful vibration is not imparted to the support frame F, when the drive shaft 28 is rotated. As the drive shaft 28 rotates 180° from the position illustrated in FIG. 4 to the position illustrated in FIG. 5, the crank axis $a$, which intersects the drive shaft rotational axis $b$, moves between the oppositely, horizontally inclined positions illustrated in FIGS. 4 and 5. The shaft section 32 also includes a thrust collar 33, interjacent the ends of crank-like portion 32a for a purpose to become apparent hereinafter. The drive shaft 28 includes a bore 28f communicating with the bores 16a and 30a of the shafts 16 and 30, respectively, to permit the axial flow of heat transfer medium.

Figure 3:
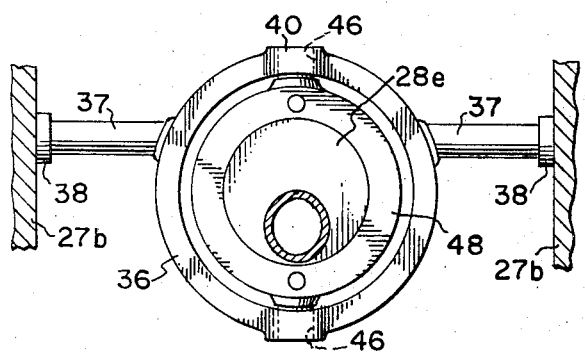
FIG. 3 is a sectional, end elevational view of the drive apparatus, taken along the line 3—3 of FIG. 1.

Provided for axially reciprocating the drive shaft 28 and the mixer shaft 16 as they are being rotated is an internal universal joint-like connector, generally designated 34, including an outer mounting ring member, generally designated 36 (FIG. 2), receiving a yoke member, generally designated 48. The ring member 36 includes a pair of horizontal trunnions 37 journaled in suitable bearings 38 (FIG. 3) provided on the side walls 27 of the frame F. As illustrated in FIG. 1, the rotational axis $c$, of the trunnions 37, is spaced a distance $d$ from the rotational axis $b$ of the drive shaft 28, but will intersect the ring 36 so that large forces can be transmitted with a very short stroke.

Upper and lower bearing blocks, generally designated 40 and 42 respectively, are provided on the outer ring member 36 and receive a pair of vertical trunnions 44 and 46, respectively, which are fixed to the upper and lower sides of the yoke member 48. The rotational axis $e$ of the vertical trunnions 44 and 46 is generally normal to the axis $c$ of the horizontal trunnions 37. The bearing blocks 40 and 42, for the vertical trunnions 44 and 46, include removable caps 40a and 42a respectively to permit the trunnions 44 and 46 to be easily installed.

A pair of thrust bearings 50 are received in the bore 49 of the yoke 48 and include bores 51 therethrough receiving the crank-like section 32a. The bearings 50 are in bearing engagement with the crank supported thrust collar 33. End caps 52, including bores 53 therethrough receiving radial bearings 54 in which the shaft section 32 is journaled, are bolted to opposite ends of the yoke 48 to maintain the thrust bearings 50 and the thrust collar 33 in abutting relation.

THE OPERATION

Upon rotation of the torque transmitting shaft 30, the drive shaft 28, including the shaft section 32, rotates to react with the yoke 48 to impart a circular wobble motion thereto and cause it to swing back and forth in a generally horizontal plane about the axis $e$ of the vertical trunnions 44 and 46. At the same time, as the shaft section 32 rotates 180°, between the positions illustrated in FIGS. 4 and 5, so that it is oppositely inclined to the horizontal and the relative positions of the shaft sections 28d and 28e are inverted, the universal joint ring member 36 reacts with the inclined shaft sections 32 through the yoke member 48 to merely swing about the axis $c$ of the trunnions 37 in a vertical plane, between the position shown in FIG. 4 and the position shown in FIG. 5.

Figure 4:
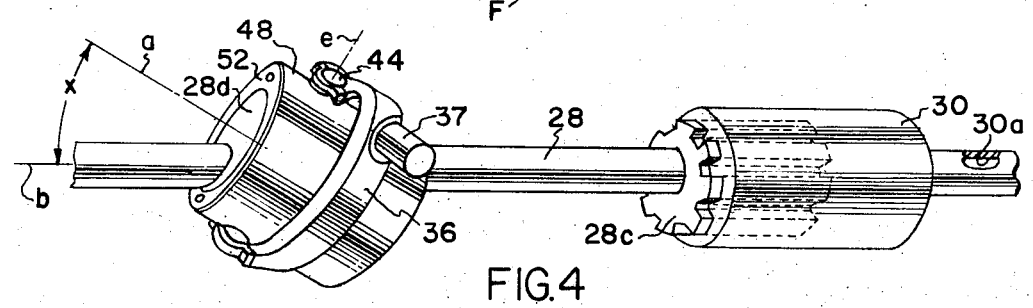
FIG. 4 is a perspective view of the drive apparatus in one position of rotation.
Figure 5:
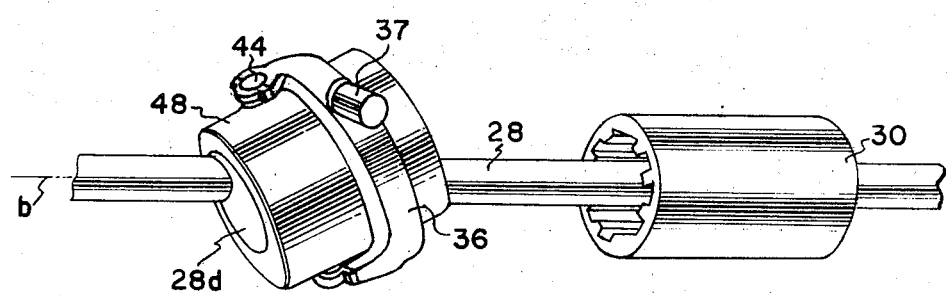
FIG. 5 is a perspective view, similar to FIG. 4, but illustrating the drive apparatus in a position rotated 180° from the position illustrated in FIG. 4.

Since the horizontal trunnions 37 cannot move horizontally, the swinging movement of the outer ring member 36 forces the shaft 28 to slide on the frame F between the position shown in FIG. 5, in which the splined shaft section 28c is axially inwardly of the input shaft section 30, and the position shown in FIG. 4, in which the shaft section 28c is pulled axially out of the splined shaft section 30. The axial movement of the shaft 28 is, of course, transmitted to the mixer shaft 16 to reciprocate the shaft 16 as it is being rotated. Rotation of the shaft 28 thus creates a lengthwise reciprocatory movement of the shaft 16 with a stroke equal to twice the distance $d$ from the inclined shaft section axis $b$ to the rotational axis $c$ multiplied by the sine of the angle $x$ between the axes $a$ and $b$.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. Apparatus for simultaneously rotating and axially reciprocating a mixer shaft, and the like, comprising:
    a stationary frame;
    a source of rotating drive power;
    a driven shaft portion supported for rotary movement and axial reciprocation;
    a rigid rotary drive shaft portion rotatably and slidably mounted on said frame and including a rigid shaft section inclined to the rotational axis of the rigid drive shaft, said drive shaft being connected to said source of rotating drive power and to said driven shaft portion; and
    connector means, including means mounted for swinging movement on said frame, reactable between said shaft section and said frame when the drive shaft portion is rotated to axially reciprocate said drive shaft portion and driven shaft portion in a to-and-fro axial and rotary path of travel as the drive shaft portion is rotated by the source of rotating drive power.

2. The apparatus of claim 1 wherein said connector means comprises a ring member swingably mounted on said frame about an axis spaced from and transverse to the rotational axis of said drive shaft portion, and a yoke member, having a bore receiving said rotating shaft section, and being mounted on said ring member for swinging movement in a plane generally normal to the plane in which said ring member swings.

3. The apparatus of claim 2 wherein the swinging axis of said ring member will intersect said ring member.

4. The apparatus of claim 1 wherein said inclined shaft section comprises equally eccentric, 180° out-of-phase shaft portions.

5. The apparatus of claim 4 wherein said inclined shaft portion section is integral with said drive shaft.

6. The apparatus set forth in claim 4 wherein said reactable means comprises a mounting ring swingably mounted on said frame about said transverse axis and in a first plane, and a yoke member swingably mounted on said ring for movement in a plane generally normal to said first plane.

7. Apparatus for reciprocating and rotating a mixer kneading shaft, and the like, comprising:
    a frame part;
    a source of rotating drive power;
    a driven shaft portion supported for rotary movement and axial reciprocation;
    a rigid drive shaft portion, connected between said source and driven shaft portion, including a rigid section axially inclined to the rotational axis of the drive shaft portion; and universal joint means mounting said drive shaft section on said frame to react therewith so that said drive shaft portion will move in a to-and-fro axial path of travel when it is rotated and thereby reciprocate and rotate the driven shaft portion.

8. The apparatus set forth in claim 7 wherein said mounting means includes a ring member swingably mounted on said frame for movement in a first plane and a yoke member receiving said axially inclined section and mounted on said ring member for swinging movement in a second plane, generally normal to said first plane.

9. In a mechanism which includes a mixer shaft and a source of rotating drive power, apparatus for simultaneously rotating and axially reciprocating the mixer shaft comprising: a frame; a drive shaft portion, mounted for rotation about, and reciprocation along, an axis of rotation, connected to the source of rotating drive power and to said mixer shaft; said drive shaft portion including a section which is inclined to the said axis of rotation; and a connector, including a part mounted for swinging movement on said frame, which is reactable between said shaft portion and said frame when the drive shaft portion is rotated to axially reciprocate said drive shaft portion in a to-and-fro axial path of travel as the drive shaft portion is rotated.

* * * * *